(12) United States Patent
Robert (10) Patent No.: US 10,373,175 B2
(45) Date of Patent: Aug. 6, 2019

(54) METHOD AND SYSTEM FOR ASSOCIATING A CONSUMER WITH PRODUCT REDEMPTION DATA

(75) Inventor: Arnaud Robert, Simi Valley, CA (US)

(73) Assignee: Disney Enterprises, Inc., Burbank, CA (US)

(*) Notice: Subject to any disclaimer, the term of this patent is extended or adjusted under 35 U.S.C. 154(b) by 980 days.

(21) Appl. No.: 13/179,408

(22) Filed: Jul. 8, 2011

(65) Prior Publication Data

US 2012/0066052 A1 Mar. 15, 2012

Related U.S. Application Data

(60) Provisional application No. 61/403,125, filed on Sep. 9, 2010.

(51) Int. Cl.
*G06Q 30/02* (2012.01)
(52) U.S. Cl.
CPC ......... *G06Q 30/02* (2013.01); *G06Q 30/0236* (2013.01)
(58) Field of Classification Search
CPC ..................................................... G06Q 30/00
USPC .......................... 705/14.36; 726/4; 707/769
See application file for complete search history.

(56) References Cited

U.S. PATENT DOCUMENTS

| | | | |
|---|---|---|---|
| 4,949,256 A | 8/1990 | Humble | |
| 5,056,019 A | 10/1991 | Schultz | |
| 5,200,889 A | 4/1993 | Mori | |
| 5,202,826 A | 4/1993 | McCarthy | |
| 5,233,514 A | 8/1993 | Ayyoubi | |
| 5,388,165 A | 2/1995 | Deaton | |
| 5,467,269 A | 11/1995 | Flaten | |
| 5,612,527 A * | 3/1997 | Ovadia ............... G06Q 20/201 235/375 |
| 5,729,693 A | 3/1998 | Holda-Fleck | |
| 5,774,870 A | 6/1998 | Storey | |
| 5,883,620 A | 3/1999 | Hobbs | |
| 5,903,874 A | 5/1999 | Leonard | |
| 5,915,244 A | 6/1999 | Jack | |
| 5,983,196 A | 11/1999 | Wendkos | |
| 6,002,771 A | 12/1999 | Nielsen | |
| 6,009,415 A | 12/1999 | Shurling | |
| 6,039,244 A | 3/2000 | Finsterwald | |
| 6,173,267 B1 | 1/2001 | Cairns | |
| 7,742,993 B2 | 6/2010 | Driessen | |
| 2009/0043645 A1 * | 2/2009 | Barnett et al. .................. 705/10 |
| 2010/0049603 A1 * | 2/2010 | Peterson et al. ........... 705/14.45 |

OTHER PUBLICATIONS

U.S. Appl. No. 12/728,218, filed Mar. 21, 2010, Grecia.

(Continued)

*Primary Examiner* — Peter H Choi
*Assistant Examiner* — Michael J Cross
(74) *Attorney, Agent, or Firm* — Farjami & Farjami LLP (57) ABSTRACT

There is presented a method and system for using a product redemption data associated with an identity of a consumer in a memory of a computer having a processor. The method comprises receiving the product redemption data, searching the memory using the processor to find the product redemption data, and identifying the consumer in response to finding the product redemption data associated with the identity of the consumer in the memory.

20 Claims, 3 Drawing Sheets

(56) References Cited

OTHER PUBLICATIONS

STR3EM Product Disclosure, Jun. 22, 2009: Retrieved from the Internet <http://aws.amazon.com/customerapps/2621>.
STR3EM for Windows application on Cnet Download.com, Dec. 9, 2009: Retrieved from the Internet <http://download.cnet.com/STR3EM/3010-13632_4-10976652.html?tag=contentBody;sideBar>.

* cited by examiner

METHOD AND SYSTEM FOR ASSOCIATING A CONSUMER WITH PRODUCT REDEMPTION DATA

RELATED APPLICATIONS

This application claims priority to U.S. Provisional Application No. 61/403,125, filed on Sep. 9, 2010, which is hereby incorporated by reference in its entirety.

BACKGROUND OF THE INVENTION

1. Field of the Invention

The present invention relates generally to providing computer mediated consumer services. More particularly, the present invention relates to methods and systems for associating a product redemption code with a consumer of the product identified with the redemption code.

2. Background Art

Advances in communication and information technologies have resulted in more content being more widely available to consumers than ever before. As the richness and variety of that content has grown, so too have the expectations of consumers, so that a consumer may now typically expect to be able to access desired content across multiple formats, and/or be provided with supplemental content or other associated content capable of enriching or extending the consumption experience.

In the case of digital media content, for example, it is now quite common for entertainment content provided on a digital video disc (DVD) or high-definition optical disc, such as Blu-ray Disc™ optical discs, for example, to be distributed as a content bundle including primary content and supplemental content associated with the primary content. Blu-ray Disk is a trademark owned by the Blu-ray Disk Association (BDA) in the United States and other jurisdictions. For instance, primary content comprising a movie may be bundled with supplemental content related to the making of the movie, biographies of actors and actresses featured in the movie, alternate scenes omitted from the primary version of the movie, and the like. In addition, in some instances the primary content may be bundled with associated content not packaged and distributed with the primary content, but redeemable by the consumer through use of a redemption code distributed with the primary content.

Such an approach to linking purchase or acquisition of a unit of content to the right to access and/or purchase supplemental assets on favorable terms need not be limited to media content, however. A similar approach to redemption rights can be utilized in combination with a wide spectrum of commercial products, whether marketed as goods or services, so as to render the primary good or unit of service acquired by the consumer more useful, of greater value, and consequently more desirable to the consumer.

A significant disadvantage associated with conventional approaches to enabling consumers to utilize product redemption codes to access or obtain benefits associated with a product purchase or acquisition is that conventional redemption transactions typically occur as isolated and effectively terminal events. In other words, a redemption transaction is typically treated as simply a quid pro quo for the consumer's prior acquisition of a particular product. As a result, there is no mechanism within the conventional redemption framework for associating the redemption to a particular consumer, and of course, taking advantage of such association to gather useful information and provide additional services.

Accordingly, there is a need to overcome the drawbacks and deficiencies in the art by providing a solution for associating a consumer with product redemption data, such as a product redemption code, and enabling use of the product redemption code as an identifying credential providing access to a variety of privileges on an ongoing basis.

SUMMARY OF THE INVENTION

There are provided methods and systems for associating a consumer with product redemption data, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a method and system for associating a consumer with product redemption data. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. It should be borne in mind that, unless noted otherwise, like or corresponding elements among the figures may be indicated by like or corresponding reference numerals.

Figure 1A:
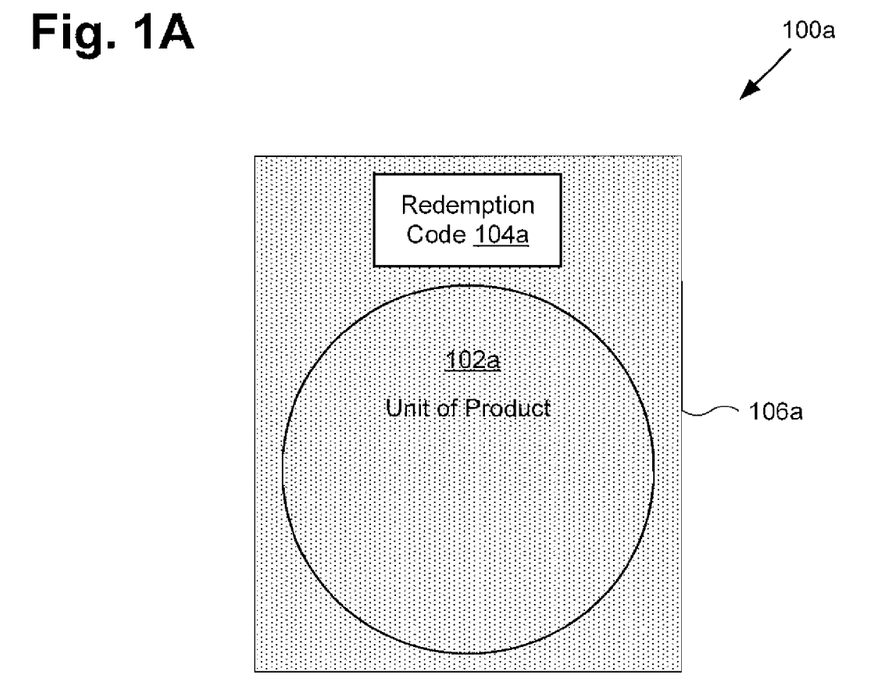
FIG. 1A shows a unit of a product represented as packaged media, and its corresponding product redemption code.
Figure 1B:
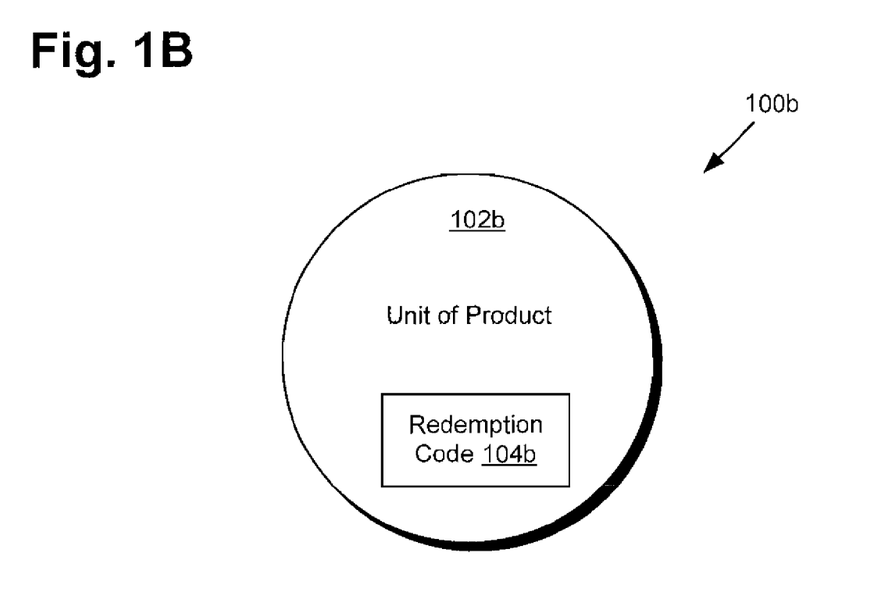
FIG. 1B shows a unit of a product represented as a physical media including stored media content, and its corresponding redemption code.

FIGS. 1A and 1B show alternative arrangements for providing a redemption code with a unit of a product. FIG. 1A shows redemption code 104a implemented as a traditional packaging or box code disposed on, in, or with product package 100a. As may be seen from FIG. 1A, product package 100a includes unit of product 102a, e.g., a digital video disc (DVD), high-definition disc such as a Blu-ray Disc brand disc, or other optical media disc, enclosed in semi-transparent packaging 106a. According to the arrangement shown in FIG. 1A, redemption code 104a, which may be an alphanumeric code, for example, is printed onto or otherwise affixed to packaging 106a. Packaging 106a may be a rigid plastic case, for example, or a flexible cover or sleeve for protecting unit of product 102a during commercial distribution and/or sales display. Redemption code 104*a* may be air printed onto packaging 106*a*, or printed onto an adhesive label affixed to packaging 106*a*, or provided as an adjunct to unit of product 102*a* in a number of different ways. For example, in addition to an alphanumeric code, redemption code 104*a* may take the form of a graphical, symbolic, digital, or bar code, and may be printed on packaging 106*a* or printed on an insert within packaging 106*a*, provided on a receipt or other document to a consumer of unit of product 102*a* at the time of purchase, or provided electronically. A consumer in possession of product package 100*a* can enjoy media content stored on unit of product 102*a*, and utilize redemption code 104*a* to access or acquire supplemental content associated with unit of product 102*a*.

Turning to FIG. 1B, FIG. 1B shows an alternate implementation in which redemption code 102*b* may be integrated onto physical media 100*b* comprising unit of product 102*b*. As indicated by FIG. 1B, unit of product 102*b* is once again represented as an optical disc. According to the example implementation shown in FIG. 1B, the redemption code 104*b* is stored directly on physical media 100*b*.

By way of example, consider the case of audio-visual content, such as movie content, distributed for commercial sale as unit of product 102*b* in the form of a DVD disc. In that instance, associated or supplemental content may include the primary movie content in another media format, such as a digital file available for consumption and/or download over the Internet, for example. Alternatively, associated content may comprise other movies thematically related to the primary movie content, or a music soundtrack of the primary movie content, for example. In any of those situations, the consumer of the audio-visual content recorded on unit of product 102*b* may have the opportunity to access the associated or supplemental content by virtue of their acquisition of unit of product 102*b*. As shown in FIG. 1B, the purchased or otherwise acquired disc, e.g., unit of product 102, may have encoded onto it a redemption code or other redemption data, e.g., redemption code 104*b*, that the consumer may utilize to identify themselves as being in possession of physical media 100*b* and therefore entitled to access the associated content on the agreed upon terms. As a result, the consumer may enjoy an extended consumption experience through access to the associated or supplemental content.

However, as previously discussed, a significant disadvantage of conventional approaches to enabling consumers to utilize product redemption codes to access or obtain benefits associated with a product purchase or acquisition is that conventional redemption transactions typically occur as isolated and effectively terminal events. In other words, a redemption transaction is typically treated simply as a quid pro quo for the consumer's prior acquisition of a particular product, rather than as an opportunity for the consumer to become engaged in an ongoing relationship centered on the consumer's possession of and presumptive interest in the acquired product. As a result, the consumer may be deprived of timely information regarding updates, improvements, or new products related to their product acquisition that may be of high desirability to the consumer.

Moreover, the present inventor has realized that an otherwise simple redemption code may be transformed into a valuable asset for the consumer and service providers if, after a redemption occurs, the redemption code becomes a proxy for the consumer, capable of identifying the consumer without the consumer being required to provide additional credentialing data. When implemented in such a manner, use of the redemption code by the consumer is no longer a terminal event, but becomes part of an ongoing process by which the consumer is identified and enjoys benefits from that identification on an ongoing basis.

As a specific example of a benefit accruing to the consumer from use of a redemption code as a proxy for a consumer identity, consider the situation described above, in which a consumer of DVD disc 102*b* can be identified using redemption code 104*b*. In that case, not only can the consumer access supplemental content or other assets associated with DVD disc 102*b*, but the playback experience of DVD disc 102*b* and/or supplemental content can be personalized according to the known preference of the consumer. That is to say, because, according to the present inventive concepts, redemption code 104*b* is used as a proxy for the consumer identity, it enables identification of the consumer as well as identification of any preferences associated with the consumer through a user profile or according to a user history. As a result, the viewing experience of the consumer can by customized according to the those preferences through configuration of playback settings, selection of displayed menus, and the like, and that configuration can occur automatically, without consumer intervention. In addition, that benefit may be portable. For instance, after association of redemption code 104*b* and the consumer identity has occurred, the consumer could insert DVD disc 102*b* into an unfamiliar playback system that nevertheless has network connectivity, be identified using redemption code 104*b*, and have the resources of the unfamiliar playback system automatically configured for the known preferences of the consumer according to data received over the network.

Furthermore, use of the redemption code as a proxy for the identity of a consumer allows the redemption process to be more flexible. The association of the redemption code with the consumer identity also enables redemption across many independent redemption code providers. For example, a provider of redemption code 104*b* may permit benefits associated with that redemption code to by combined with benefits associated with other providers, such as movie theaters, product retailers, or entertainment theme parks. Thus, redemption code 104*b* may be redeemed for a movie ticket at a theatre, or a discount at a particular store, or both, despite being distributed as a redemption code associated with unit of product 102*b*. By associating redemption codes with the consumer and enabling their use as proxies for the consumer's identity, rather than tying a redemption code to a specific purchase or transaction, the benefits associated with each redemption code can be advantageously aggregated across commercial channels in a manner largely transparent to the consumer.

Figure 2:
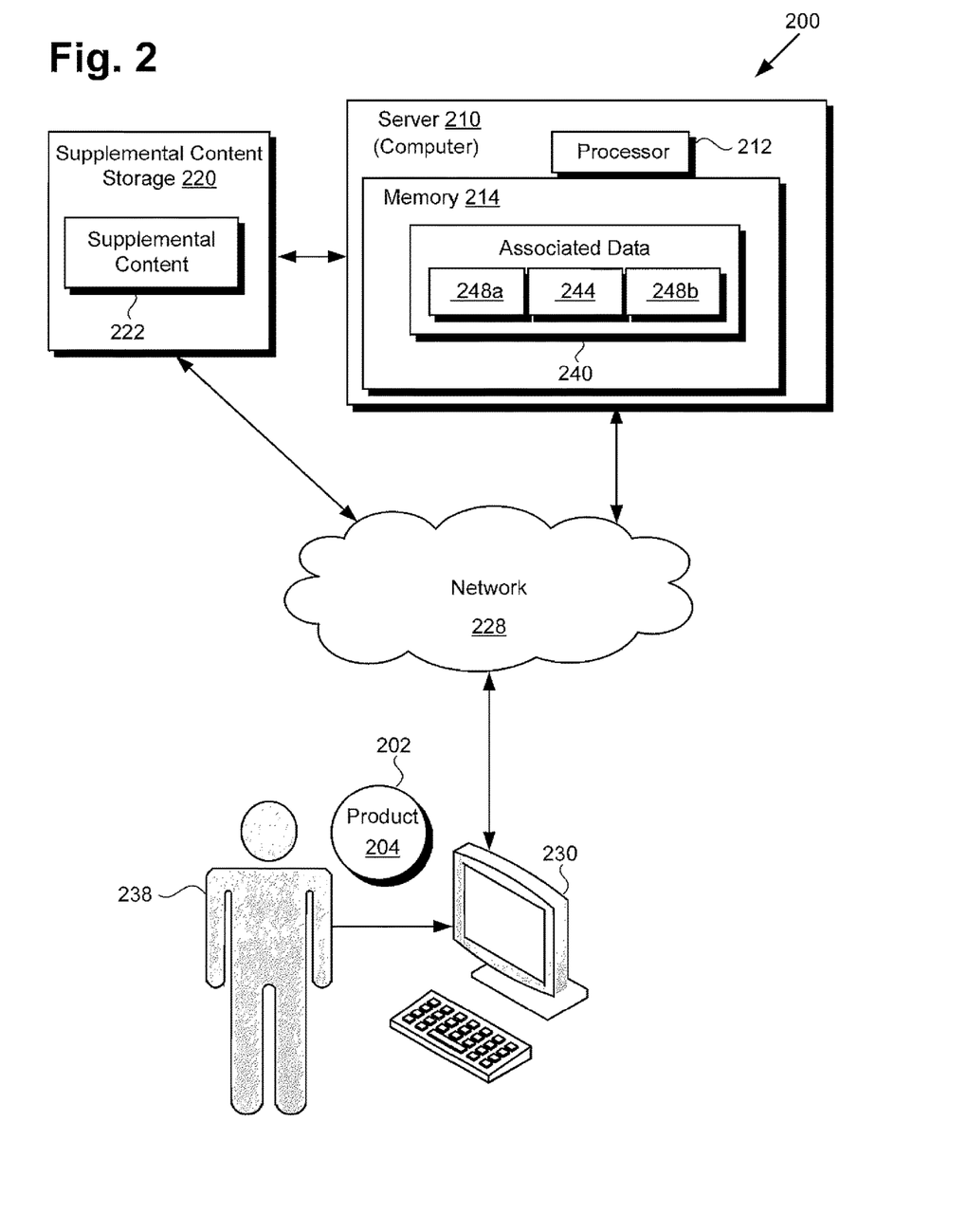
FIG. 2 shows a block diagram of a system for associating a consumer with product redemption data, according to one embodiment of the present invention.

Referring now to FIG. 2, FIG. 2 shows a block diagram of system 200 for associating a consumer with product redemption data, according to one embodiment of the present invention capable of overcoming the drawbacks and deficiencies in the conventional art by providing the benefits described above. As shown in FIG. 2, system 200 comprises consumer/product association server 210 including server processor 212 and server memory 214. As further shown in FIG. 2, consumer/product association server 210 is accessible to client device 230 over network 228. Client device 230, which in general may be any client device or system capable of communicating over network 228 and including a client processor and a client memory, is represented in FIG. 2 as a personal computer (PC) configured to read and/or playback media content stored on unit of product 202.

Unit of product 202 corresponds to unit of product 102*b* in FIG. 1B, and may once again represented by an optical disc, for example. Unit of product 202 includes redemption code 204, which may correspond uniquely to unit of product 202, and which corresponds to redemption code 104*b*, shown in FIG. 1B. Also shown in FIG. 2 is associated data 240 comprising consumer data 248*a*, product redemption data 244, and consumer data 248*b*, stored in server memory 214 of consumer/product association server 210, as well as supplemental content storage 220 including supplemental content 222.

According to the embodiment of FIG. 2, consumer 238 may utilize client device 230 and network 228 to access consumer/product association server 210 to redeem supplemental assets, such as supplemental content 222, for example, acquirable through submission of redemption code 204 included on unit of product 202. In addition to receiving product redemption data 244 corresponding to redemption code 204 and mediating redemption of supplemental content 222 by consumer 238, system 200 is configured to receive consumer data corresponding to an identity of consumer 238, such as consumer data 248*a* and/or 248*b*, to associate product redemption data 244 with consumer data 248*a* and/or 248*b*, and to use product redemption data 244 as a proxy for consumer data 248*a* and/or 248*b*, thereby enabling identification of consumer 238 from redemption code 204.

In one embodiment, as shown in FIG. 2, system 200 is configured to receive more than one consumer data corresponding to more than one identity of the consumer, e.g., different user IDs of consumer 238, and to associate the different consumer identities with one another, as well as to associate each consumer identity with the redemption data. For example associated data 240 may comprise consumer data 248*a* corresponding to an identity of consumer 238, consumer data 248*b* corresponding to another identity of consumer 238, and redemption data 244. As further shown in FIG. 2, in one embodiment, the resulting associated data 240 may be stored in server memory 214.

Supplemental content 222 associated with unit of product 202 may comprise one or more digital media files, for example. In some embodiments, redemption by consumer 238 using redemption code 204 may provide temporary or permanent access to content associated with the media content stored on unit of product 202, such as one or more digital media files residing in supplemental content storage 220. In other embodiments, however, the redemption using redemption code 204 may authorize consumer 238 to subsequently arrange for transfer of supplemental content 222, such as one or more digital media files, to his or her possession, perhaps through purchase and/or download of supplemental content 222 to client device 230 over network 228, for example. Moreover, by associating consumer 238 and unit of product 202 through the corresponding association of consumer data 248*a* and/or 248*h* with product redemption data 244, system 200 can advantageously provide consumer 238 with timely information regarding available updates and/or upgrades associated with unit of product 202, as well as information regarding availability of other products that may be desirable to consumer 238.

It is noted that although in the present embodiment, unit of product 202 is represented as a particular good, i.e., an optical disc, that representation is provided merely as an example. As used herein the term "product" may be used to describe either tangible goods or intangible services. In other words, unit of product 202 may comprise any cognizable product unit, such as an article of merchandise or a quantum of service. Furthermore, although supplemental content 222 has been described as comprising one or more digital media files, that too is merely an example of the form supplemental content 222 may take. In other embodiments, supplemental content 222 may comprise other items of media, such as printed media, recorded video or film content, recorded music content, games, or objects, such as tokens, plush toys, or prizes, for example.

It is further noted that although the embodiment of FIG. 2 characterizes the feature corresponding to reference number 210 as consumer/product association server 210, it is understood that in other embodiments consumer/product association server 210 may be characterized simply as computer 210. Moreover, although FIG. 2 shows client device 230 as a PC, in other embodiments client device 230 may correspond to another type of personal communication device, such as a mobile telephone, digital media player, personal digital assistant (PDA), or tablet computer, for example, or to an entertainment device or system such as a regular definition or high-definition (HD) optical disc player, or a wired or wireless gaming console.

Figure 3:
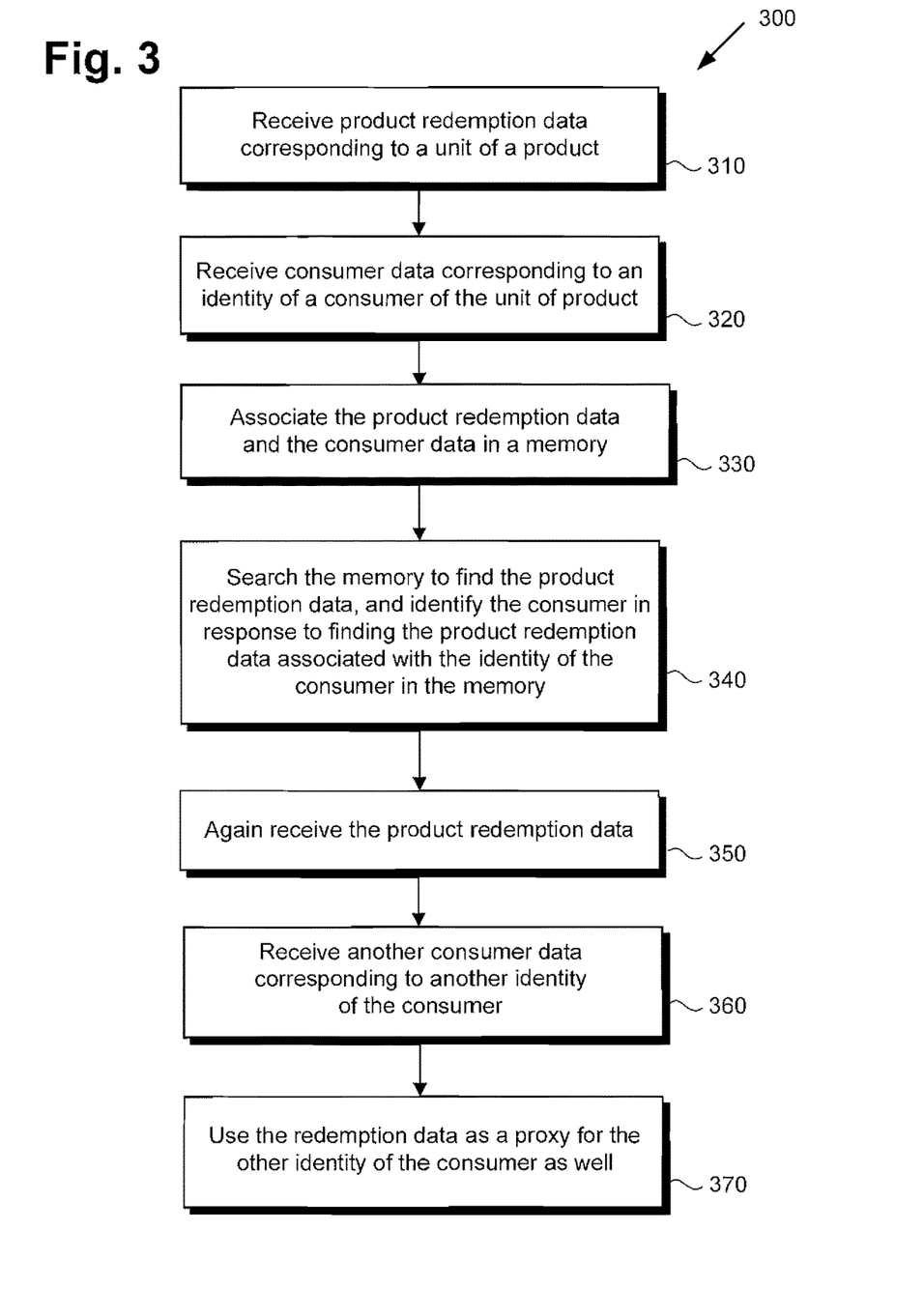
FIG. 3 is a flowchart presenting a method for associating a consumer with product redemption data, according to one embodiment of the present invention.

The operation of system 200 will now be further described in conjunction with FIG. 3, which presents flowchart 300 of a method for associating a consumer with product redemption data, according to one embodiment of the present invention. It is emphasized, however, that the steps shown in flowchart 300 are merely exemplary, so that a step may consist of one or more substeps or may involve specialized equipment or materials, as known in the art. While steps 310 through 370 indicated in flowchart 300 are sufficient to describe one embodiment of the present method, other embodiments may utilize steps different from those shown in flowchart 300, or may include more, or fewer steps.

Beginning with step 310 in FIG. 3, and referring to system 200, in FIG. 2, step 310 of flowchart 300 comprises receiving product redemption data. In one embodiment, product redemption data, which may comprise redemption code 204, for example, may correspond uniquely to a particular unit of product, such as unit of product 204. Alternatively, in some embodiments, product redemption data may correspond uniquely to the content stored on unit of product 202, or to any other relevant characteristic or feature of unit of product 202. For example, where, as in FIG. 2, unit of product 202 is a physical media on which is stored movie content, redemption data comprising redemption code 204 may be uniquely tied to any of the physical media itself, the movie content on the physical media, a genre of the movie content, the title of the movie content, and actor or actors appearing in the movie, or to a geographical region to which unit of product 202 is distributed for sale, and the like.

In one embodiment, step 310 may correspond to receipt, by consumer/product association server 210, of redemption code 204 from consumer 238, over network 228. For example, consumer 238 may send redemption code 204 to consumer/product association server 210 using networked client device 230. In another embodiment, however, step 310 may be performed through direct detection of redemption code 204 by system 200. For example, in embodiments in which system 200 includes client device 230 configured to read and/or playback content stored on unit of product 202, step 310 may correspond to receipt of redemption code 204 by system 200 through its detection by client device 230. As a more specific example, where unit of product 202 is a movie disc and redemption code 204 is stored as content on the disc, client device 230 may comprise a networked disc or multimedia player capable of reading redemption code 204 from unit of product 202. Moreover, in some embodiments, receiving the product redemption data in step 310 may include both reading redemption code 204 from unit of product 202 by networked client device 230, and delivering redemption code 204 to consumer/product association server 210 over network 228.

Moving to step 320 in FIG. 3 and continuing to refer to system 200, in FIG. 2, step 320 of flowchart 300 comprises receiving consumer data, e.g., consumer data 248a, corresponding to an identity of consumer 238. Step 320 may correspond, for example, to receipt, by consumer/product association server 210, of a user ID, such as an OpenID, of consumer 238, from client device 230 over network 228. Alternatively, in another embodiment, memory 214 of consumer/product association server 210 may include a database of consumer IDs (not explicitly shown in FIG. 2) including consumer data 248a. In this latter embodiment, step 320 may correspond to receiving the consumer data from memory 214 for association with the product redemption data received in step 310.

Continuing with step 330 in FIG. 3, step 330 of flowchart 300 comprises associating the product redemption data and the consumer data in memory 214 using processor 212. Referring once again to system 200, in FIG. 2, step 330 may be performed by consumer/product association server 210, resulting in associated data 240 including product redemption data 244 and consumer data 248a, for example. In some embodiments, the present method may include requesting authorization from the consumer before associating the product redemption data and the consumer data. For example, in one embodiment, system 200 may be configured such that consumer 238 is prompted to provide authorization prior to consumer data and/or product redemption data being sent from client device 230 to consumer/product association server 210 over network 228. Thus, in that embodiment, sending the consumer data and/or the product redemption data from client device 230 to consumer/product association server 210 is contingent upon authorization by consumer 238. Thereafter, association of the consumer data and the product redemption data may be performed by consumer/product association server 210.

According to at least one embodiment of the present method, the associated data may be stored. Referring again to FIG. 2, associated data 240 may be stored in memory 214 of consumer/product association server 210. More generally, however, associated data 240 may be stored in any suitable data repository accessible by consumer/product association server 210. That is to say, in some embodiments, associated data 240 may be stored on a computer-readable medium remote from consumer/product association server 210, but accessible to processor 212 of consumer/product association server 210 over network 228.

As shown by step 340 of flowchart 300, after the association of product redemption data 244 and consumer data 248a, the present method continues by using redemption data 244 as a proxy for consumer data 248a. As a result, after step 330 has occurred, step 340 enables identification of consumer 238 from redemption code 204. Thereafter, redemption code 204 may be used by consumer 238 as a substitute for other credentialing data when interacting with consumer/product association server 210, or when interacting with a third party entity through consumer/product association server 210. More specifically, at step 340 the method includes searching memory 214 using processor 212 to find product redemption data or code 204, and identifying consumer 238 in response to finding product redemption data or code 204 associated with the identity of consumer 238 in memory 214.

In some embodiments, associated data 240 may subsequently be updated or modified. For example, embodiments of the present invention contemplate circumstances in which consumer 238 may have the opportunity to perform more than one redemption using redemption code 204. For instance, on one occasion, consumer 238 may perform a first redemption using redemption code 204 and providing a first consumer ID corresponding to consumer data 248a, and a second redemption at another time, again using redemption code 204 but on this occasion providing another consumer ID corresponding to consumer data 248b. In those circumstances, as shown by steps 350 through 370 of flowchart 300, some embodiments of the present system and method may be configured for again receiving product redemption data 244 corresponding to redemption code 204, receiving consumer data 248b corresponding to the other identity of consumer 238, and associating consumer data 248b with product redemption data 244, thereby enabling use of product redemption data as a proxy for consumer data 248b as well.

In addition, redemption data, such as redemption code 204 may be used to grant access to one or more services that require the identity of consumer 238 by using the product redemption data as a substitute for the identity consumer 238. For example, processor 212 of consumer/product association server 210 can be configured to grant access to multiple services that require the identity of consumer 238 by using product redemption code 204 as a substitute for the identity consumer 238 on each service. In one embodiment, processor 212 may be further configured to communicate association of the product redemption code 204 with the identity of consumer 238 between the multiple services that require the identity of consumer 238, as well as to link respective consumer profiles of consumer 238 associated with one or more of the multiple services. Moreover, in some embodiments, a system for associating a consumer with product redemption data, such as system 200, may be configured to provide additional value added services to the consumer when the first or subsequent redemptions are made using the product redemption data. For example, based on the nature of unit of product 202, system 200 may be configured to offer one or more goods and/or services for acquisition by consumer 238, wherein the particular goods and/or services offered are determined using redemption code 204. In addition, in situations in which more than one redemption is performed using redemption code 204 in combination with distinct consumer identities associated with distinct consumer domains, system 200 may be further configured to authorize sharing or exchange of the consumer identities among the consumer domains. In at least one of those latter embodiments, system 200 may also be configured to mediate the sharing or exchange of consumer identities between consumer domains, such as by acting as an honest broker for an exchange of consumer identities.

Thus, the present application discloses a method and system for associating a consumer with product redemption data, and to subsequently use the product redemption data as a proxy for the consumer's identity. From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method comprising:
receiving, by a processor, a first product redemption data and an identity of a consumer, wherein, prior to the receiving, the first product redemption data along with a first product are distributed without the first product redemption data having been associated with any consumer;
associating, by the processor in a memory, the identity of the consumer with the first product redemption data in response to receiving the first product redemption data and the identity of the consumer;
receiving, after the associating, the first product redemption data from a playback device;
using, after the receiving of the first product redemption data from the playback device, the first product redemption data as a substitute for the identity of the consumer by:
searching the memory using the processor to find the first product redemption data; and
identifying, based on the searching, the consumer using the first product redemption data found in the memory and associated with the identity of the consumer in the memory;
providing the consumer with updates to the first product, in response to the identifying the consumer using the first product redemption data.

2. The method of claim 1, wherein the first product redemption data is unique to a single unit of the first product.

3. The method of claim 1, wherein prior to the receiving of the first product redemption data, the method comprising reading the first product redemption data from a media content including the first product redemption data.

4. The method of claim 1, wherein receiving the first product redemption data comprises receiving a product redemption code from the consumer over a network.

5. The method of claim 1, wherein receiving the first product redemption data comprises receiving the first product redemption data from a networked multimedia player of the consumer.

6. The method of claim 1, wherein prior to associating the identity of the consumer with the first product redemption data, the method further comprising receiving, by the processor, consumer data corresponding to the identity of the consumer.

7. The method of claim 6, further comprising requesting an authorization from the consumer before associating the first product redemption data with the identity of the consumer.

8. The method of claim 1, further comprising associating at least a second product redemption data with the identity of the consumer to enable use of the at least second product redemption data to further identify the consumer.

9. The method of claim 1, further comprising linking a consumer profile of the consumer associated with the plurality of services that requires the identity of the consumer and a second consumer profile of the consumer associated with a second plurality of services that requires the identity of the consumer.

10. The method of claim 1, wherein receiving the first product redemption data comprises receiving the first product redemption data from the consumer over a network, the method further comprising:
receiving the first product redemption data over the network;
identifying the consumer using the first product redemption data; and
offering at least one of a good or a service for acquisition by the consumer, the at least one good or service determined according to the first product redemption data.

11. A computer comprising:
a memory having stored therein a product redemption data associated with an identity of a consumer;
a processor configured to:
receive the first product redemption data and the identity of the consumer, wherein, prior to the receiving, the first product redemption data along with a first product are distributed without the first product redemption data having been associated with any consumer;
associate the identity of the consumer with the first product redemption data in response to receiving the first product redemption data and the identity of the consumer;
receive, after the associate, the first product redemption data from a playback device:
use, after the receive of the first product redemption data from the playback device, the first product redemption data as a substitute for the identity of the consumer by:
searching the memory using the processor to find the first product redemption data; and
identifying, based on the search, the consumer using the first product redemption data found in the memory and associated with the identity of the consumer in the memory;
provide the consumer with updates to the first product, in response to identifying the consumer using the first product redemption data.

12. The computer of claim 11, wherein the first product redemption data is unique to a single unit of the first product.

13. The computer of claim 11, wherein prior to receiving the first product redemption data, the first product redemption data is read from a media content including the first product redemption data.

14. The computer of claim 11, wherein receiving the first product redemption data comprises receiving a product redemption code from the consumer over a network.

15. The computer of claim 11, wherein receiving the first product redemption data comprises receiving a product redemption code from a networked multimedia player of the consumer.

16. The computer of claim 11, wherein prior to associating the identity of the consumer with the first product redemption data, the processor is further configured to receive consumer data corresponding to the identity of the consumer.

17. The computer of claim 16, wherein the processor is further configured to request an authorization from the consumer before associating the first product redemption data with the identity of the consumer.

18. The computer of claim 11, wherein the processor is further configured to associate at least a second product redemption data with the identity of the consumer to enable use of the at least second product redemption data to further identify the consumer.

19. The computer of claim 11, wherein the processor is further configured to link a consumer profile of the consumer associated with the plurality of services that requires the identity of the consumer and a second consumer profile of the consumer associated with a second plurality of services that requires the identity of the consumer.

20. The computer of claim 11, wherein receiving the first product redemption data comprises receiving the first product redemption data from the consumer over a network, and wherein the processor is further configured to:
- receive the first product redemption data over the network;
- identify the consumer using the first product redemption data; and
- offer at least one of a good or a service for acquisition by the consumer, the at least one good or service determined according to the first product redemption data.

* * * * *